UNITED STATES PATENT OFFICE.

KIHEGE OCHI, OF STOCKTON, CALIFORNIA.

PROCESS OF PRODUCING USEFUL FIBER.

1,315,635.     Specification of Letters Patent.     Patented Sept. 9, 1919.

No Drawing.     Application filed July 5, 1918. Serial No. 243,442.

*To all whom it may concern:*

Be it known that I, KIHEGE OCHI, a subject of Japan, residing at Stockton, in the county of San Joaquin and State of California, have invented certain new and useful Improvements in Processes of Producing Useful Fiber; and I do declare the following to be a clear, full, and exact description of the same.

This invention relates to a process for producing a useful fiber from the hitherto unutilized bark of willow trees, the principal object of the invention being to produce such a process for treating the bark whereby it will become flexible and to a certain extent elastic, and hence may be used in the manufacture of sacks and similar articles instead of the hemp weave now used.

A further object of the invention is to produce a process for the purpose above stated to which the bark may be subjected without the need of any especial apparatus or scarce or expensive chemicals, and which can be carried out by any inexperienced person.

These and other objects are accomplished in the following manner:—

The bark is stripped from the tree in any desired manner in pieces of a suitable length. These are then dried in the sun until all the moisture therein has evaporated. The strips are then soaked in water until fairly pliable, when they are shredded to form strips of about the same size as a hemp thread as used in sacks. These shreds are then immersed and boiled for ten minutes in a bath comprised of equal parts of any one of the ordinary forms of vegetable or mineral oils, such as linseed, cottonseed, machine oil, and the like, and water in which is a small amount of common salt and about three times that amount of soda. For any ordinary sack, such as an onion or potato sack, three pounds of willow bark are necessary, and the bath will have approximately the following quantities of ingredients:

1 gallon oil,
1 gallon water,
1 teaspoonful salt,
3 teaspoonful soda.

The oil saturates the bark, and renders it permanently flexible. The addition of salt toughens the fiber without affecting its softness.

The small amount of soda added tends to bleach the shreds, but being in contact therewith for only a short period of time, merely turns the blotched appearance of the bark into a pleasing chocolate color of uniform appearance, and after being thoroughly dried in the sun the shreds are ready for use and may be woven into sacks in any manner used in the art, being very flexible and durable.

From the foregoing description it will be seen that I have produced such a process as substantially fulfils the objects of the invention as set forth herein.

While this specification sets forth the present and preferred quantities of the ingredients used in the process, still in practice, such deviations from such quantities may be resorted to as do not depart from the spirit of the invention, as defined by the appended claims.

Having thus described my invention, what I claim as new and useful and desire to secure by Letters Patent is:—

1. The process of treating willow bark consisting of drying the bark in the sun as stripped from the tree, then soaking it in water, boiling the same in a bath consisting of suitable proportions of oil, water, salt and soda, and redrying the same in the sun.

2. The process of producing a useful fiber from the bark of willow trees, consisting of drying the bark in the sun as stripped from the tree, soaking it in water when so dried, shredding the same when so soaked, boiling such shreds in a bath consisting of suitable proportions of oil, water, salt and soda, and drying such treated shreds in the sun.

3. The process of producing a useful fiber from the bark of willow trees, consisting of drying the bark in the sun as stripped from the tree, soaking it in water, shredding the same to form strips of a suitable width, boiling such strips for ten minutes in a bath consisting of suitable proportions of oil, water, salt and soda, then drying the boiled strips in the sun.

In testimony whereof I affix my signature in presence of two witnesses.

KIHEGE OCHI.

Witnesses:
VERADINE WARNER,
BERNARD PRIVAT.

Copies of this patent may be obtained for five cents each, by addressing the "Commissioner of Patents, Washington, D. C."